Dec. 27, 1932.　　　　　S. P. MILLER　　　　　1,892,469
METHOD AND APPARATUS FOR DISTILLING TAR AND SIMULTANEOUSLY
PRODUCING HIGH AND LOW MELTING POINT PITCHES
Filed Aug. 29, 1929　　　4 Sheets-Sheet 1

INVENTOR
Stuart Parmelee Miller
BY
Pennie Davis Marvin & Edmonds
ATTORNEYS

Dec. 27, 1932.  S. P. MILLER  1,892,469
METHOD AND APPARATUS FOR DISTILLING TAR AND SIMULTANEOUSLY
PRODUCING HIGH AND LOW MELTING POINT PITCHES
Filed Aug. 29, 1929  4 Sheets-Sheet 2

INVENTOR
Stuart Parmelee Miller
BY
Pennie Davis Marvin & Edmonds
ATTORNEYS

Dec. 27, 1932.  S. P. MILLER  1,892,469
METHOD AND APPARATUS FOR DISTILLING TAR AND SIMULTANEOUSLY
PRODUCING HIGH AND LOW MELTING POINT PITCHES
Filed Aug. 29, 1929   4 Sheets-Sheet 3

Fig. 4.

INVENTOR
Stuart Parmelee Miller
BY
Pennie Davis Marvin & Edmonds
ATTORNEYS

Dec. 27, 1932.   S. P. MILLER   1,892,469
METHOD AND APPARATUS FOR DISTILLING TAR AND SIMULTANEOUSLY
PRODUCING HIGH AND LOW MELTING POINT PITCHES
Filed Aug. 29, 1929   4 Sheets-Sheet 4

INVENTOR
Stuart Parmelee Miller
BY
Pennie Davis Marvin & Edmonds
ATTORNEYS

Patented Dec. 27, 1932

1,892,469

UNITED STATES PATENT OFFICE

STUART PARMELEE MILLER, OF ENGLEWOOD, NEW JERSEY, ASSIGNOR TO THE BARRETT COMPANY, OF NEW YORK, N. Y., A CORPORATION OF NEW JERSEY

METHOD AND APPARATUS FOR DISTILLING TAR AND SIMULTANEOUSLY PRODUCING HIGH AND LOW MELTING POINT PITCHES

Application filed August 29, 1929. Serial No. 389,141.

This invention relates to improvements in the distillation of tar and includes improvements in process and apparatus therefor. More particularly, the invention relates to a process in which tar is distilled by direct contact with highly heated foul fuel gases, such as hot foul coke oven gases, to produce a high melting point pitch, and the gases and vapors resulting from this distillation are employed for further distillation by being brought into direct contact with partially distilled tar to produce a low melting point pitch, at least a portion of which is drawn off as a separate pitch product. The resulting gases and vapors are employed for heating tar by bringing the tar into indirect heat-exchange relation with the gases and vapors and the tar thus heated by indirect heat exchange with the hot gases and vapors is passed to a vapor chamber where the vapors produced are separated from the distillation residue. At least a portion of this distillation residue is then subjected to further distillation by being brought into direct contact with the gases later employed for distilling the tar by indirect contact.

According to this invention, there are two stages of direct contact distillation. In the first stage a high melting point pitch is produced by direct contact with highly heated waste gases. In the second stage, the gases and vapors resulting from the first stage are employed for distilling a partially distilled tar to a low melting point pitch. Tar is brought into indirect heat-exchange relation with the resulting gases and vapors and thereby heated and then distilled by separating vapors therefrom, and then passed to a vapor box to separate the vapors formed. The residue of partially distilled tar is then distilled to pitch of low melting point in the second stage of the direct contact distillation and at least a portion of this low melting point pitch product is drawn off as a separate product of the process.

The vapor chamber to which the tar heated by indirect heat-exchange with the hot enriched gases from the direct distillation is passed may be a vacuum chamber in which vapors are distilled under reduced pressure. The residue from this vacuum distillation is subjected to further distillation by direct contact with the hot gases and vapors from the first stage of the distillation of tar by direct contact with the highly heated gases.

The hot gases and vapors resulting from the two stage distillation of tar by direct contact with the hot gases are cooled in effecting the preheating and partial distillation of the tar by indirect heat exchange with tar, and substantially clean oils are simultaneously recovered by condensation from the gases and vapors so cooled.

A portion of the pitch product resulting from distillation by indirect heat exchange of the hot gases and vapors with or without reduction in pressure by the use of a vacuum chamber, may be withdrawn from the vapor chamber as a separate product of the process, or all of this distillation residue may be further distilled by direct contact. The vapors resulting from the distillation by indirect contact are advantageously separately condensed to form a separate distillate product of low boiling range. The separate collection and removal of this low boiling distillate before the tar is brought into direct contact with the gases employed for the distillation, facilitates the recovery of oil vapors from the gases. The difficulties incident to removing low boiling oils from a relatively large volume of gases such as would result without separate recovery of this fraction at this point are avoided.

According to this invention, two separate pitches, namely, a low melting point pitch and a pitch of higher melting point, are produced by direct contact distillation, and a further pitch product may be produced by separately withdrawing a portion of the distillation residue from the vapor box. A portion of the low melting point pitch produced during the second stage of the direct contact distillation, in which the tar is brought into direct contact with the hot gases and vapors from the first stage of the direct contact distillation, may be further distilled to produce high melting point pitch, or a separate tar may be distilled in the first stage of the direct contact distillation.

Vapors produced during both the first and second stages of the direct contact distillation are recovered together in the same condensing system. The vapors resulting from the distillation by indirect heat exchange are advantageously recovered in a separate condenser to produce a separate distillate product.

The tar distilled by indirect heat exchange with the hot gases and vapors from the direct contact distillation may be coke oven tar, gas retort tar, low temperature carbonization tar, water gas tar, producer gas tar, etc., or heavier or lighter tars or tarry oils or pitches, etc. In the second stage of the direct contact distillation in which a low melting point pitch is produced, residue from the indirect heat exchange distillation is further distilled. In the first stage of the direct contact distillation in which a high melting point pitch is produced, residue from the second stage of the direct contact distillation may be employed, or a different tar or pitch may be distilled. This may be the same tar as the tar distilled by indirect heat exchange, or an entirely different tar, such as tar from a different coal carbonization process, may be employed. For example, gas retort tar may be employed in the indirect heat exchange distillation and residue from this distillation will then be employed in the second stage of the direct contact distillation process. In the first stage of the process, coke oven tar, for example, may be distilled to produce a high melting point pitch. The invention is particularly valuable for the distillation of coal tar at a by-product coke oven plant, where a large volume of high temperature gases are available, containing a large amount of waste heat which is commonly dissipated and lost. By the practice of the present invention at a by-product coke oven plant, it is possible to produce, for example, a high melting point pitch of about 400° F. melting point or higher, and a high percentage oil yield, and simultaneously to produce a low melting point pitch by utilization of the hot enriched gases from the first still by first employing them in a direct contact distillation process and using the resulting hot gases and vapors for distillation by indirect heat-exchange therewith. Various oil fractions can be simultaneously produced, such as a creosote oil, a tar acid or carbolic oil, etc. The distillate produced in the vapor box may be blended with low boiling distillate separated from the gases.

The apparatus of the present invention includes a primary still connected with a source of highly heated gases such as coke oven gases, with means for supplying tar or pitch thereto and for removing high melting point pitch therefrom, and with means for bringing the tar and pitch in the form of a fine intense spray into direct contact with the gases passing through the still to distill the tar or pitch to produce high melting point pitch and hot enriched gases leaving the still. The apparatus also includes a second direct contact still in which partially distilled tar is brought into direct contact with the hot enriched gases leaving the primary still. This secondary still serves to remove any entrained drops of tar which may be carried as spray from the first still and serves to further saturate the gases leaving the still in lower boiling constituents. High boiling constituents present as vapors in the gases leaving the first still in which a high melting point pitch is produced, may be condensed and blended with the residue from the distillation in this second still. This second still is provided with means for drawing off the resulting low melting point pitch, while the gases and vapors leaving the second still are passed to a heat interchanger for the condensation of oils therefrom and the simultaneous heating and distilling of tar, the residue from which distillation is to be subjected to further distillation in this second still.

A vapor chamber is provided to receive the tar which has been heated and partially distilled in the heat interchanger. Although this vapor chamber may be connected directly with the condensing system so that vapors produced by the heating and distillation by indirect heat exchange in the heat interchanger may be condensed in the same condensing system as the oils distilled by direct contact, a separate condensing system is advantageously provided for recovering oils distilled by this indirect heat exchange. The vapor box may be provided with a separate draw-off for separately collecting a portion of the residue as a separate pitch or partly distilled tar product. At least a portion of the residue from this distillation by indirect heat exchange with the hot gases and vapors is brought into direct contact with the hot gases and vapors from the first distillation and further distilled to produce a low melting point pitch, which is one of the products of the process.

The gases employed in the primary still for carrying out the primary distillation to produce high melting point pitch are the highly heated foul gases which are available in large amounts and at high temperatures at various coal carbonization or distillation plants such as coke oven plants, gas retort plants, producer gas plants, water gas plants, low temperature carbonization plants, etc. The gases from coke ovens, for example, leave the coke ovens at temperatures of 450° to 850° C. or higher. These highly heated gases are at such a high temperature that if brought into contact with a limited amount of tar or pitch in an indiscriminate manner, coking of the tar or pitch takes place, since the gases are at a temperature considerably higher than that at which coking of pitch occurs. However, by bringing relatively large amounts of tar or pitch in the form of an intense and well distributed spray into thorough contact with the highly heated gases, the gases can be rapidly and almost instantly carried to a much lower temperature and the tar or pitch can be rapidly distilled in this way to produce pitch of high melting point, for example, pitch of melting point up to 400° F. or higher. When pitch of such a high melting point is produced, the gases and admixed vapors leave the still at a high temperature, for example, at a temperature about 250 to 400° C. These hot enriched gases may be saturated with respect to the heaviest constituents distilled from the still, but they are not saturated with respect to lower boiling constituents. These hot enriched gases have a considerable distillation capacity for partially distilled tar, and by bringing a regulated amount of such tar into direct and intimate contact with the hot enriched gases, a considerable distillation of oils from the tar can be effected with resulting increase in the content of lower boiling oil vapors in the enriched gases. In this second stage of the direct contact distillation, some of the heaviest constituents carried in the hot enriched gases may be condensed, such as heavy resinous or solid constituents, depending upon the temperature to which the hot enriched gases are cooled by direct contact with the partially distilled tar from the vapor chamber. Such heavy constituents as are separated out from the hot enriched gases will be drawn off with the low melting point pitch.

Not all of the low melting point pitch from the second stage of the direct contact distillation is further distilled in the first stage of the direct contact distillation. A portion or all of the low melting point pitch from this second stage of the distillation is separately collected as a separate low melting point pitch product. The high melting point pitch produced in the first stage of the direct contact distillation may be from tar from an entirely different source. By controlling the temperature at which the tar is supplied to the first still, that is, the still in which a high melting point pitch is produced, and by regulating the amount of tar and gases supplied to this still and the melting point to which the tar is distilled, the temperature of the gases leaving this first still and the vapor gases leaving this first still and the vapor content of these gases is controlled. The amount of partially distilled tar supplied to the second still is controlled independently of the amount of tar or pitch supplied to the first still, except that where the material distilled in the first still is low melting point pitch produced in the second still, the amount distilled in the first still is necessarily less than that distilled in the second still, as some of the low melting point pitch from the second still is drawn off as a separate pitch product. The melting point of the low melting point pitch produced in this second stage of the direct contact distillation may therefore be controlled independently of the melting point of the high melting point pitch produced in the first stage of the direct contact distillation. Moreover, since a portion of the distillation residue from the distillation by indirect heat exchange with the hot gases and vapors may be separately drawn off as a separate low melting point pitch product, the amount of tar brought into indirect heat-exchange with the hot gases and vapors may be independent of the amount of tar distilled either in the first or second stages of the direct contact distillation, except that the amount of partially distilled tar brought into direct contact with the hot gases and vapors from the first stage of the direct contact distillation is never greater than the amount of residue produced by the indirect contact distillation. Since the various distillation stages of this process are at least partially independent of one another, the process may be regulated to produce various desired pitch products.

The invention will be further described in connection with the accompanying drawings which are of a more or less diagrammatic character and which illustrate different forms of apparatus embodying the invention and adapted for the practice of the process of the invention, but it is intended and will be understood that the invention is illustrated thereby but is not limited thereto. The drawings show the invention applied more particularly at a coke oven plant with utilization of the hot coke oven gases drawn from the individual coke ovens at a high temperature and employed under conditions where practically their maximum distillation capacity can be utilized. In the drawings.

Figure 1:
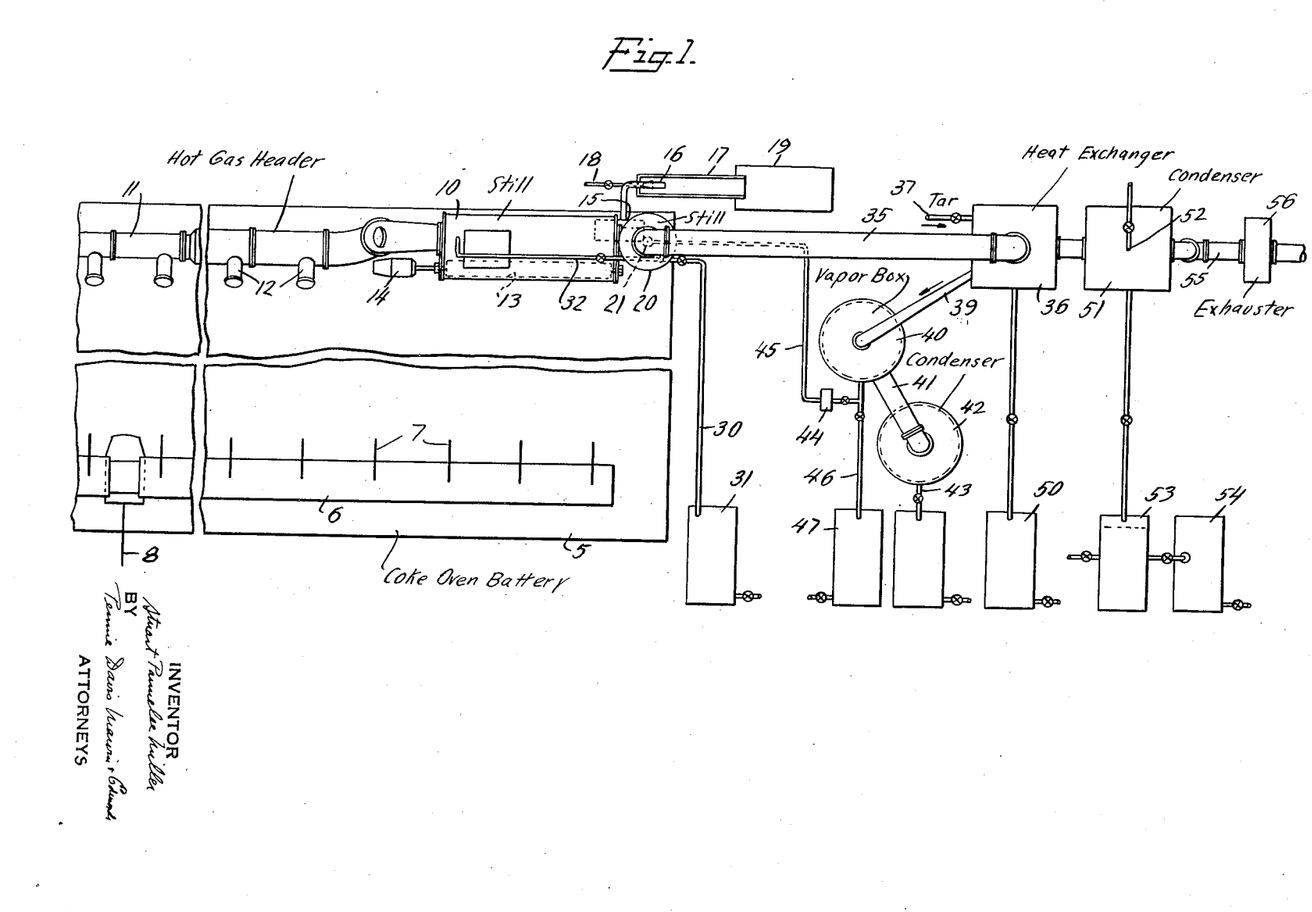
Fig. 1 is a plan view of a coke oven plant equipped with apparatus for carrying out this invention.

In the drawings, 5 is a coke oven battery equipped with a collector main 6 which is connected with the ovens of the battery through uptake pipes 7. 8 is a cross-over main connecting the collector main 6 with a suitable condensing system. This apparatus is shown more or less diagrammatically in the drawings and may be of the usual type.

At the side of the battery opposite the collector main is a still 10 which is the primary still for the first stage of the direct contact distillation of this invention. This still is advantageously connected with the coke ovens through a hot gas header 11 and uptake pipes 12. These uptake pipes 12 are connected with selected ovens of the battery and these selected ovens are also advantageously connected with the collector main 6 through uptake pipes 7 of the usual type. By the proper manipulation of valves in the uptake pipes 12 and in the uptake pipes 7, the gases from the selected ovens may be directed either to the collector main 6 or through the hot gas header 11 to the primary still 10.

Figures 2, 3:
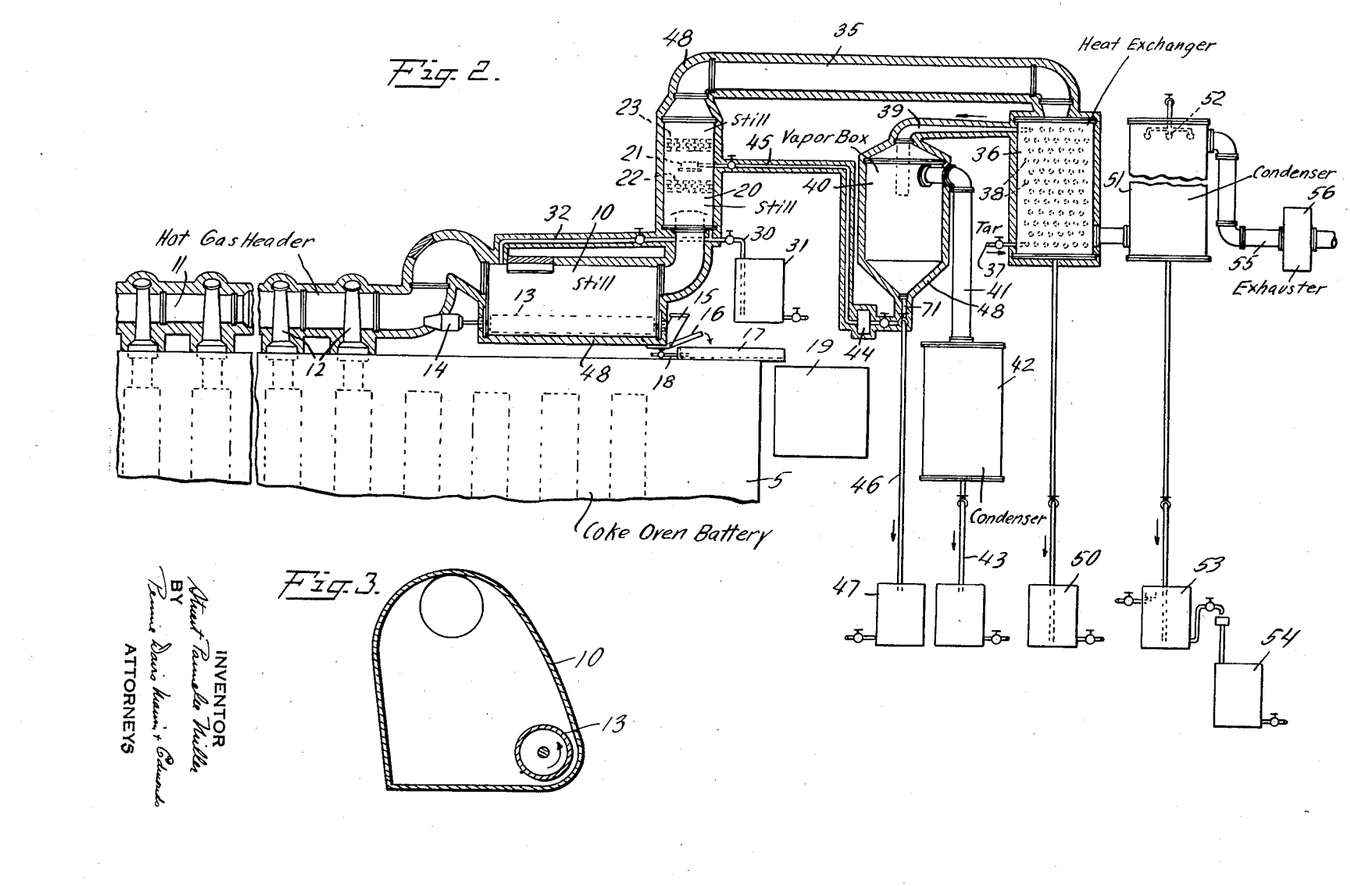
Fig. 2 is an elevation partly in section of the apparatus of Fig. 1.
Fig. 3 is a section on the line 3—3 of Fig. 2.

This still is equipped with mechanical atomizing or spraying means for producing an intense spray of tar in the gases, whereby the tar is distilled and the gases are substantially detarred. This spraying means comprises the roll 13 which is adapted to be rotated by the motor 14 at high speed, for example, at a speed of 900 to 1200 R. P. M. The roll 13 is positioned on a horizontal axis and dips to a slight extent into a body of tar maintained in the still. The roll sprays the tar up into the hot gases, causing distillation of the tar and simultaneous scrubbing of the gases. The roll is advantageously situated on one side of the main as shown in Fig. 3 so that the tar is washed up over the wall of the main 10 and keeps it free from deposits of pitch. The pitch formed in the still is withdrawn from the coke trap 15 through the levelling arm 16. The position of the levelling arm determines the height to which the tar or pitch rises in the main 10 and thus controls the nature of the spray produced by the roll. The pitch from this main 10 which is a high melting point pitch, is advantageously drawn off into the trough 17 and suddenly chilled by cold water from the line 18. The pitch which is thus granulated may be collected in the bin 19 and used for any suitable purpose.

The hot gases and vapors leaving this first still pass through a second still 20 which is advantageously located above the first still 10 and is in the form of a tower, which serves as a settling tower to allow any droplets of spray carried from the still 10 to settle out of the gases. In this tower, the hot gases and vapors are brought into direct contact with tar which has been partially distilled by indirect heat-exchange with the hot gases and vapors leaving the tower. This partially distilled tar is sprayed through the nozzle 21 into the hot gases and vapors rising through the tower. Baffle means 22 are provided below the spray nozzle to expose a large surface of the partially distilled tar to the action of the hot gases and vapors leaving the first still 10. This serves also to remove entrained particles of spray carried from the first still by the hot gases. Additional baffles 23 are provided above the spray nozzle 21 to remove any particles of the spray carried by the gases from the nozzle 21. The baffling means 22 and 23 may be composed of Raschig rings or may be of any other suitable type.

According to the arrangement shown in Fig. 1, only a portion of the low melting point pitch resulting from the distillation in the tower 20 is drawn off as a separate low melting point pitch product. This portion is drawn off through the line 30 into the storage tank 31. The balance of this low melting point pitch is conducted through the line 32 into the still 10. Where high melting point pitch is produced it is advantageous to pass the tar or pitch being distilled and the hot gases through the still in a concurrent direction so that the low melting point tar or pitch comes into contact with the fresh hot unsaturated gases, and the partially cooled and somewhat saturated gases leaving the still are in contact with the high melting point pitch. This tends to prevent over-distillation of the tar with excessive formation of coke, and the pitch leaves the still at a relatively low temperature, thus economizing heat.

The hot gases and vapors from the still 20 which comprise vapors present in the gases as they leave the ovens and also vapors from the distillation in the still 10, together with vapors from the distillation in the tower still 20, which gases are substantially free from entrained particles, are passed through the main 35 to the heat interchanger 36. In this heat interchanger, the hot gases and vapors are brought into indirect heat-exchange relation with fresh tar which enters the heat interchanger at 37, passes up through the coil 38 in a direction countercurrent to the flow of hot gases in the heat interchanger, and leaves the heat interchanger through the line 39 and passes to the vapor box 40. The tar is heated and partially distilled in the heat interchanger and vapor box and vapors resulting from this distillation separate from the undistilled residue in the vapor box and pass off through the main 41 into the condenser 42. The vapors are condensed and a clean low boiling oil fraction is drawn off at 43. Distillation residue from the vapor box 40 is pumped by the pump 44 to the spray 21 in the tower still 20 by means of the line 45, although the vapor box 40 may be elevated to the extent that the pump 44 may if desired be dispensed with. A portion of the distillation residue from the vapor box 40 may be drawn off through the line 46 into the low melting point pitch storage tank 47.

The stills 10 and 20, the heat interchanger 36 and the vapor box 40, and the interconnecting pipes, may advantageously be insulated as indicated at 48.

According to the arrangement in Figs. 1 and 2, the hot gases from the ovens are first brought into direct contact with low melting point pitch from the still 20 in the first still 10, and a high melting point pitch is produced which is collected in 19. The hot gases and vapors from this first still are used for further distillation by being brought into direct contact with the partially distilled tar in the tower still 20. A portion of the pitch produced in this second stage of the direct contact distillation is drawn off into the low melting pitch storage tank 31, and the remainder is supplied to the first still 10 through the line 32. The hot gases and vapors from this direct contact distillation are employed for further distillation by indirect heat-exchange with tar in the heat interchanger 36. Low melting point pitch resulting from this distillation, and separated in the vapor box 40 from the vapors produced, may be in part drawn off as a separate product in the storage tank 47 and the remainder is supplied through the line 45 to the second direct contact still 20. Low boiling distillate from this indirect heat exchange distillation is obtained in the storage tank 43.

The indirect heat exchange distillation in the heat interchanger may be so regulated that only oils of relatively high boiling range are separated from the gases in the heat interchanger, and these oils may be separately collected in the storage tank 50. The gases from the heat interchanger may then be passed to a separate condenser 51 where they may be sprayed with water or ammonia liquor from the line 52 to separate lower boiling oils which may be separately collected from the decanter 53 in the oil storage tank 54 as a carbolic oil fraction. An indirectly cooled condenser may be used if desired, but is not shown in the drawings. These oils may if desired be blended with the oils of low boiling range obtained in 43. From the condenser 51 the gases will pass through the line 55 and the exhauster 56 to means for the recovery of ammonia and light oils, etc.

Figure 4:
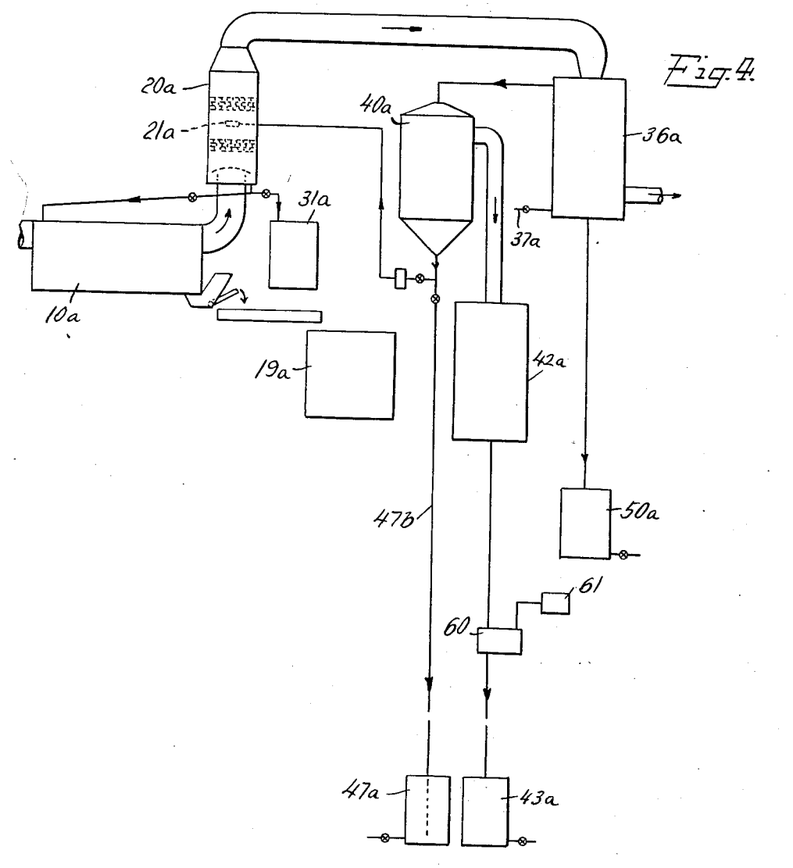
Fig. 4 is a diagrammatic showing of apparatus similar to that shown more in detail in Figs. 1, 2 and 3, but provided with a vacuum pump for operating the vapor box under reduced pressure.
Figure 5:
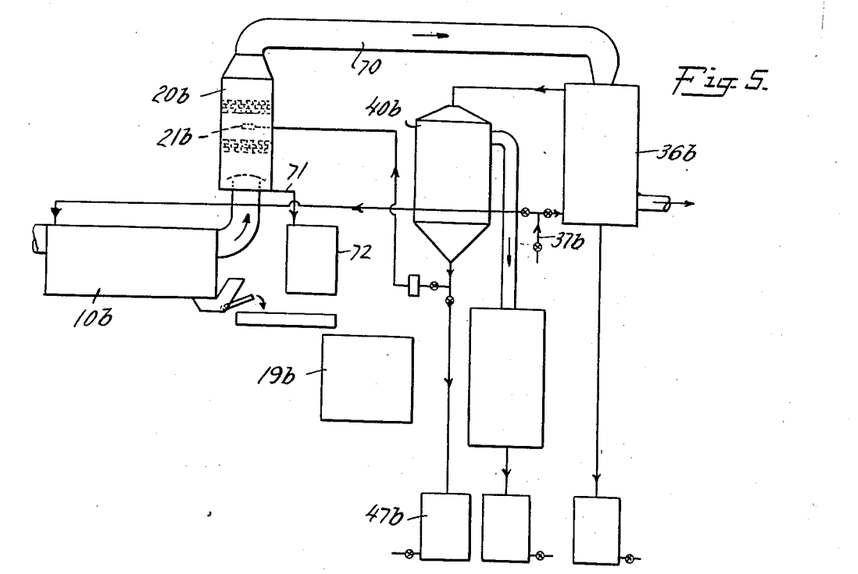
Fig. 5 is a diagrammatic showing of modified apparatus.
Figure 6:
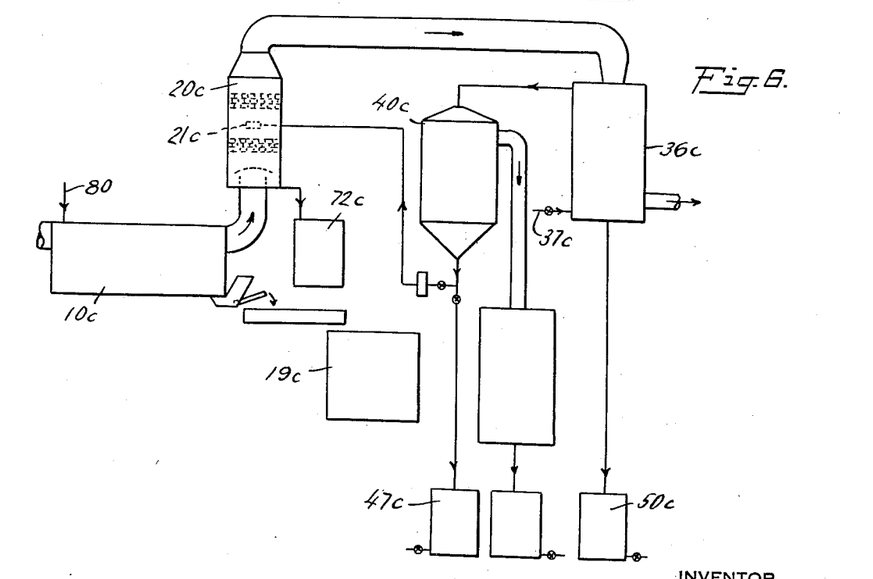
Fig. 6 is a diagrammatic showing of still another modification.

Figs. 4, 5 and 6 show modifications of the apparatus shown in greater detail in Figs. 1, 2 and 3. These drawings show the apparatus diagrammatically only. Fig. 4 shows apparatus similar to that shown in Figs. 1, 2 and 3, but with the addition of a vacuum pump for operating the vapor box under a reduced pressure.

The hot gases pass first through the still 10a and then through the tower 20a and then to the heat interchanger 36a. The tar enters at 37a, is heated in the heat interchanger and passes to the vapor box 40a; the distillation residue then is sprayed into the hot gases and vapors in the tower 20a through the nozzle 21a. High melting point pitch is collected in 19a and low melting point pitch is collected in 31a. The vapor box 40a is equipped with a condenser 42a. Between the condenser 42a and the storage tank 43a for low boiling distillate, is a separator 60 connected with a vacuum pump 61. By operating the vapor chamber 40a under a vacuum, the removal of a larger percentage of oils is effected and a pitch of higher melting point is produced, or larger quantities of tar may be distilled to lower melting point pitch than if no vacuum pump is used. This pitch is collected in the pitch storage tank 47a. Clean oils from the heat interchanger 36a are collected in the storage tank 50a.

By operating the vapor chamber under a vacuum, a larger quantity of tar may be distilled to produce pitch of a desired low melting point in the tank 47a, than is possible when no vacuum is thus employed. A greater quantity of low melting point pitch may be produced and sprayed through the nozzle 21a into the still 20a, than is possible without the use of a vacuum, but the temperature of this pitch will be lower than the temperature of pitch distilled under normal pressure.

Fig. 5 shows another modification of the apparatus shown in Figs. 1 and 2. The hot gases enter the still 10b and high melting point pitch is produced in this still. According to the arrangement shown in Fig. 5, tar similar to that passed through the heat interchanger and admitted to the system through the line 37b, is supplied through the line 70 to the still 10b. This tar may be preheated, where desired, as by indirect heat exchange with hot flue gases, or a portion of the tar preheated in preheater 36b may be run directly to the still. According to Fig. 5, the high melting point pitch produced in the still 10b and collected in the storage tank 19b, is pitch produced by distillation of this tar and not pitch resulting from further distillation of low melting point pitch produced in the tower 20b. All of the pitch produced when the distillation residue from the indirect heat exchange distillation in 40b is sprayed into the tower 20b through the nozzle 21b, is withdrawn at the bottom of this tower through the line 71 and separately collected in the low melting point pitch receiver 72. A portion of the distillation residue from the vapor box 40b may be separately collected in the low melting point pitch storage tank 47 where desired.

The process indicated in Fig. 6 differs from that shown in Fig. 5 in supplying to the still 10c a tar which is distinct from that supplied to the heat interchanger through the line 37c. The tar which is distilled in the first still 10c may be tar from an entirely different operation than that employed for the production of the tar supplied at 37c. This tar supplied to 10c through the line 80 may be preheated in any suitable manner as by indirect heat-exchange with hot flue gases. The amount of tar may be regulated independently from the amount of tar supplied at 37c and thus the melting point of the pitch produced in 19c may be controlled independently of the melting point of the pitches produced at 72c and at 47c, and the operation is so regulated that the temperature and vapor content of the enriched gases passing from the still 10c into the still 20c is such as to produce pitch of the desired low melting point in this second still. The pitch from the second still is drawn off into the storage tank 72c. The clean oil collected at 50c comprises higher boiling constituents distilled from the tar supplied through the line 80 to the still 10c and also constituents distilled from the tar supplied at 37c and distilled in the second still 20c, and where hot coke oven gases, for example, are employed for the distillation, vapors of higher boiling oils originally present in the gases as they leave the ovens will be condensed in the heat interchanger 36c, together with vapors resulting from the distillation in the first and second stills, and will be present in the clean oil recovered in 50c.

In each of Figs. 4, 5 and 6 additional condensing means will be provided beyond the heat interchangers 36a, 36b and 36c.

The modification shown in Figs. 5 and 6 are indicative of various modifications comprised by the invention, but the invention is not limited thereto. For example, by operating the vapor box 40b or 40c under a vacuum a larger percent of low boiling distillate may be recovered as the result of the indirect heat exchange distillation, or a larger quantity of tar may be distilled to produce distillate of the same boiling range as that produced under ordinary pressure. The amount of tar passed through the heat interchanger may be varied and the amount of low melting point pitch drawn off from the vapor box, and the pressure maintained on the vapor box may be varied to regulate the operation. The amount of tar distilled in the primary still and the extent to which it is distilled, that is, the melting point of the high melting point pitch produced, may be varied and thus the temperature and vapor content of the gases passing through the second still may be varied and the distillation effected in this still may thus be regulated. The distillation in this second still may also be regulated by varying the amount of tar supplied to the heat interchanger and the amount of low melting point pitch drawn off from the vapor box and the pressure at which the vacuum box is operated.

I claim:

1. The method of distilling tar from a coal distillation or gasification plant with highly heated foul fuel gases from the distillation of coal and producing high melting point pitch, pitch of lower melting point and distillate which comprises bringing tar or pitch in the form of an intense spray into direct and intimate contact with the hot gases whereby the tar is distilled and high melting point pitch is produced, bringing partially distilled tar into direct contact with the gases and vapors resulting from this distillation to distill the partially distilled tar and produce low melting point pitch, collecting at least a portion of this low melting point pitch as a separate product and bringing the combined gases and vapors resulting from said first and second distillations into indirect heat-exchange relation with tar, whereby distillate is condensed from the gases and the tar is heated above the boiling point of lower boiling constituents, collecting vapors of such constituents and cooling them to produce a clean oil product and distilling at least a portion of the partially distilled tar thus produced by direct contact with the hot gases and vapors from the first distillation.

2. The method of distilling tar from a coal distillation or gasification plant with highly heated foul fuel gases from the distillation of coal and producing high melting point pitch, pitch of lower melting point, and distillate, which comprises bringing tar or pitch in the form of an intense spray into direct and intimate contact with the hot gases whereby the tar is distilled and high melting point pitch is produced, bringing partially distilled tar into direct contact with the gases and vapors resulting from this distillation to distill the partially distilled tar and produce low melting point pitch, collecting at least a portion of this low melting point pitch as a separate product and bringing the gases and vapors resulting from this second distillation into indirect heat-exchange relation with tar, whereby distillate is condensed from the gases and the tar is heated above the boiling point of lower boiling constituents, passing the heated tar to a vapor box, maintaining the vapor box under reduced pressure whereby vapors of low boiling range are separated from distillation residue and further distilling at least a portion of the distillation residue by bringing it into direct contact with the gases and vapors from the first distillation.

3. The method of distilling tar from a coal distillation or gasification plant with highly heated foul fuel gases from the distillation of coal and producing high melting point pitch, pitch of lower melting point and distillate which comprises bringing low melting point pitch in the form of an intense spray into direct and intimate contact with the hot gases whereby the pitch is distilled and high melting point pitch is produced, bringing partially distilled tar into direct contact with the gases and vapors resulting from this distillation to distill the partially distilled tar and produce low melting point pitch, collecting at least a portion of this low melting point pitch as a separate product and bringing the gases and vapors resulting from this second distillation into indirect heat-exchange relation with tar, thereby condensing distillate from the gases and heating the tar above the boiling point of lower boiling constituents, separating vapors of such lower boiling constituents from the residue of partially distilled tar, further distilling at least a portion of this residue by direct contact with hot gases and vapors from the first distillation to produce said low melting point pitch and further distilling a portion of the low melting point pitch to pitch of high melting point in the first distillation.

4. The method of distilling tar from a coal distillation or gasification plant with highly heated foul fuel gases from the distillation of coal and producing high melting point pitch, pitch of lower melting point and distillate which comprises bringing tar or pitch in the form of an intense spray into direct and intimate contact with the hot gases whereby the tar is distilled and high melting point pitch is produced, bringing partially distilled tar into direct contact with the gases and vapors resulting from this distillation to distill the partially distilled tar and produce low melting point pitch, collecting at least a portion of this low melting point pitch as a separate product and bringing the gases and vapors resulting from this second distillation into indirect heat-exchange with tar of the same composition as that distilled in the first still whereby distillate is condensed from the gases and the tar is heated above the boiling point of lower boiling constituents, separating vapors of such lower boiling constituents, thereby producing a residue of partly distilled tar and further distilling at least a portion of the partly distilled residue by direct contact with the hot gases and vapors from the first distillation.

5. The method of distilling tar from a coal distillation or gasification plant with highly heated foul fuel gases from the distillation of coal and producing high melting point pitch, pitch of lower melting point and distillate which comprises bringing tar or pitch in the form of an intense spray into direct and intimate contact with gases of high temperature whereby the tar is distilled and high melting point pitch is produced, bringing partially distilled tar into direct contact with the gases and vapors resulting from this distillation to distill the partially distilled tar and produce low melting point pitch, collecting at least a portion of this low melting point pitch as a separate product and bringing the gases and vapors resulting from this second distillation into indirect heat-exchange relation with tar of different composition from that distilled in the first still, whereby distillate is condensed from the gases and the tar is heated above the boiling point of lower boiling constituents, separating vapors of such lower boiling constituents from the resulting residue of partially distilled tar and further distilling at least a portion of the partly distilled tar by bringing it into direct contact with the hot gases and vapors from the first distillation.

6. The process of distilling tar from a coal distillation or gasification plant by hot gases resulting from the destructive distillation of coal and recovering clean oil distillate and pitch products which comprises bringing tar or pitch in the form of an intense spray into direct and intimate contact with the hot coal distillation gases at a high temperature, causing distillation of the tar to produce high melting point pitch and substantially detarring the gases, bringing partly distilled tar into direct contact with the hot gases and vapors resulting from this distillation to distill the same and produce pitch of a lower melting point, bringing the resulting enriched gases containing vapors originally present in the coke oven gases as they left the ovens, vapors from the first distillation in which high melting point pitch was produced and vapors from the second distillation in which low melting point pitch was produced into indirect heat exchange relation with tar whereby clean oil distillate is condensed from the gases and the tar is heated above the boiling point of lower boiling constituents, separating vapors of such lower boiling constituents from the resulting residue of partly distilled tar, distilling at least a portion of the residue by direct contact with the hot gases and vapors from the first distillation to produce low melting point pitch and separately collecting at least a portion of the low melting point pitch thus produced as a separate pitch product.

7. Apparatus for distilling tar by combined direct and indirect heat exchange relation with highly heated foul fuel gases which comprises a first still with means for bringing tar or pitch into intimate contact with the hot gases therein to produce high melting point pitch, a second still connected by a gas main with the first still for distilling partially distilled tar by direct contact with the hot gases and vapors from the first still, a draw-off from the second still to a pitch storage tank, a heat interchanger connected with the second still with means therein for bringing the hot gases and vapors from the second still into indirect heat-exchange relation with tar, a vapor box connected by a gas main with the heat interchanger for separating vapors from undistilled residue of tar heated in the heat interchanger, a condenser connected with the vapor box for cooling these vapors and means for supplying at least a portion of the undistilled residue from the vapor box into direct contact with the hot gases and vapors in the second still.

8. Apparatus for distilling tar by combined direct and indirect heat exchange relation with highly heated foul fuel gases which comprises a first still with means for bringing tar or pitch into intimate contact with the hot gases therein to produce high melting point pitch, a second still connected by a gas main with the first still for distilling partially distilled tar by direct contact with the hot gases and vapors from the first still, a draw-off from the second still to a pitch storage tank, a heat interchanger connected with the second still and provided with means for bringing the hot gases and vapors from the second still into indirect heat-exchange relation with tar, a vapor box connected with the heat interchanger by a gas main, means for supplying tar from the heat interchanger to the vapor box, a condenser connected with the vapor box, a vacuum pump connected with the vapor box and the condenser, a draw-off for undistilled residue from the vapor box with means to supply at least a portion of the undistilled residue from the vapor box to the second still.

9. Apparatus for distilling tar by combined direct and indirect heat exchange relation with highly heated foul fuel gases which comprises a first still with means for bringing tar or pitch into intimate contact with the hot gases therein to produce high melting point pitch, a second still connected by a gas main with the first still for distilling partially distilled tar by direct contact with the hot gases and vapors from the first still, a draw-off from the second still to a pitch storage tank, a heat interchanger connected with the second still and provided with means for bringing the hot gases and vapors from the second still into indirect heat exchange relation with tar, a vapor box connected with the heat interchanger to receive the tar heated in the heat interchanger, a condenser connected with the vapor box, means for supplying at least a portion of the residue from the vapor box to the second still and means for supplying a portion of the low melting point pitch produced in this second still to the first still.

10. In combination with a coke oven battery, a first still, means for supplying hot coke oven gases from a plurality of the ovens to this first still, agitating means in the still to produce an intense spray of tar in the still whereby the tar will be distilled to pitch and the coke oven gases will be substantially detarred, means for supplying tar or pitch to this first still, a second still connected by a gas main with the first still, a draw-off from the second still for low melting point pitch produced therein by direct contact between the partially distilled tar and gases and vapors from the first still, a heat interchanger connected with the second still and provided with means for bringing the gases and vapors from the second still into indirect heat exchange relation with tar, a vapor box, means for supplying tar from the heat interchanger to the vapor box and means for supplying at least a portion of the residue from the vapor box to the second still.

In testimony whereof I affix my signature.

STUART PARMELEE MILLER.